United States Patent [19]
Albert et al.

[11] Patent Number: 5,607,762
[45] Date of Patent: Mar. 4, 1997

[54] INK-RIBBONS COMPRISING IR-ABSORBING COMPOUNDS

[75] Inventors: Bernhard Albert, Maxdorf; Juergen Kipper, Karlsruhe; Friedrich Closs, Frankenthal; Helmut Bellaire, Ludwigshafen, all of Germany

[73] Assignee: BASF Aktiengesellschaft, Ludwigshafen, Germany

[21] Appl. No.: 513,864

[22] PCT Filed: Mar. 5, 1994

[86] PCT No.: PCT/EP94/00661

§ 371 Date: Sep. 14, 1995

§ 102(e) Date: Sep. 14, 1995

[87] PCT Pub. No.: WO94/21471

PCT Pub. Date: Sep. 29, 1994

[30] Foreign Application Priority Data

Mar. 18, 1993 [DE] Germany .................. 43 08 635.7

[51] Int. Cl.⁶ .................................................. B41M 5/025
[52] U.S. Cl. ................... 428/321.3; 428/174; 428/195; 428/411.1; 428/914
[58] Field of Search ............................ 428/321.3, 411.1, 428/195, 914, 174

[56] References Cited

U.S. PATENT DOCUMENTS 4,990,649  2/1991  Schrott et al. .

FOREIGN PATENT DOCUMENTS

| | | |
|---|---|---|
| 155780 | 2/1985 | European Pat. Off. . |
| 192215 | 2/1986 | European Pat. Off. . |
| 310080 | 9/1988 | European Pat. Off. . |
| 464543 | 6/1991 | European Pat. Off. . |
| 1073739 | 9/1958 | Germany . |
| 3826734 | 8/1988 | Germany . |
| 4022822 | 7/1990 | Germany . |
| 251578 | 2/1990 | Japan . |
| 2168372 | 12/1985 | United Kingdom . |
| 2200650 | 6/1987 | United Kingdom . |

OTHER PUBLICATIONS

The Phthalocyanines; Frank H. Moser, Arthur L. Thomas; CRC Press, Inc. Boca Raton, Florida 33431 J. Am. Chem. Soc.; 106; pp. 7404–7410, 1984.

Druckfarben–Chemie; Coating; pp. 72 to 73 and 213 to 214; Mar. 1972.

*Primary Examiner*—William A. Krynski
*Attorney, Agent, or Firm*—Oblon, Spivak, McClelland, Maier & Neustadt, P.C.

[57] ABSTRACT

Ink ribbons containing one or more compounds from the group comprising phthalocyanines, the naphthalocyanines, the nickel dithiolene complexes, the methine dyes and the azulene quaternary-acid dyes, all of which have their absorption maximum in the region from 700 to 1,200 nm.

8 Claims, No Drawings

INK-RIBBONS COMPRISING IR-ABSORBING COMPOUNDS

The present invention relates to novel ink-ribbons comprising one or more compounds of the class of the metal-free phthalocyanines, the phthalocyanines which have two times lithium, magnesium, tin, zinc, copper, manganese, nickel, VO, TiO, AlCl or InCl as central atom, the metal-free naphthalocyanines, the naphthalocyanines which have two times lithium, magnesium, tin, zinc, copper, manganese, nickel, VO, TiO, AlCl or InCl as central atom, the nickel-dithiolene complexes, the methine dyes or the azulenesquaric acid dyes which each have their absorption maximum within the range from 700 to 1200 nm.

Modern communications technology is placing a premium on fast error-free data entry. Of particular importance is the automatic, digital reading in of information which is in printed, digital or analog form. An example are printed bar codes which are scannable and readable using suitable light sources and detectors.

Commercial ink-ribbons, then, are used for printing machine-readable bar codes. By the incorporation of additives, such as carbon black, specific pigments or metal powders, it is additionally possible to read out visible bar codes even with light which has a wavelength above the visible region.

For instance, DE-A-3 826 734 describes colorants for the inkjet process which can be read out not only in the visible but also in the infrared region.

Also, JP-A-251 578/1991 discloses metal complexes with which it is possible to produce oil-based inks which absorb in the near IR region.

However, virtually all prints produced with such colorants exhibit a strong absorption in the visible.

DE-C-4 022 822 discloses the use of silicon naphthalocyanine for producing IR-readable prints.

It is an object of the present invention to provide novel ink-ribbons such that the prints produced with these ink-ribbons should have a sufficiently strong absorption in the near infrared that reading out with the suitable bar code readers is made possible. By contrast, they should have little if any absorption in the visible.

We have found that this object is achieved by the above-defined ink-ribbons.

Suitable phthalocyanines conform for example to the formula Ia

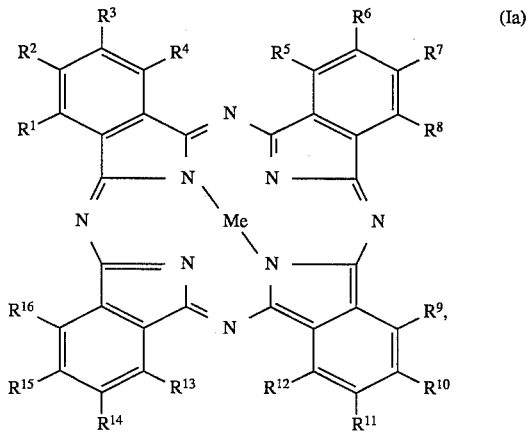

where

Me is two times hydrogen, two times lithium, magnesium, tin, zinc, copper, manganese, nickel, VO, TiO, AlCl or InCl, at least 4 of $R^1$ to $R^{16}$ are independently of one another a radical of the formula $W-X^1$, where W is a chemical bond, oxygen, sulfur, imino, $C_1-C_4$-alkylimino or phenylimino and $X^1$ is $C_1-C_{20}$-alkyl with or without interruption by from 1 to 4 oxygen atoms in ether function and with or without phenyl substitution, $C_5-C_7$-cycloalkyl or substituted or unsubstituted phenyl, and any remaining $R^1$ to $R^{16}$ are each hydrogen, halogen, hydroxysulfonyl or $C_1-C_4$-dialkylsulfamoyl.

Suitable phthalocyanines can further conform for example to the formula Ib

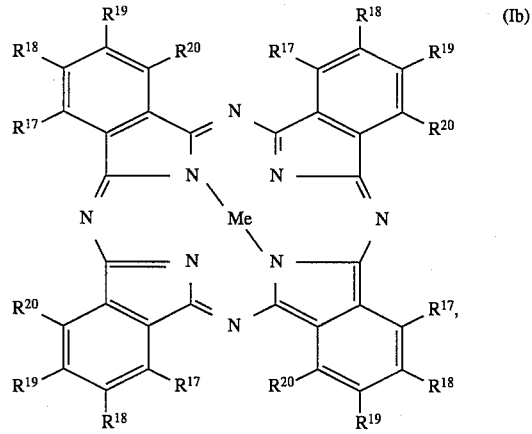

where $R^{17}$ and $R^{18}$ or $R^{18}$ and $R^{19}$ or $R^{19}$ and $R^{20}$ are together in each case a radical of the formula $X^2-C_2H_4-X^3$, where one of the two radicals $X^2$ and $X^3$ is oxygen and the other is imino or $C_1-C_4$-alkylimino, $R^{19}$ and $R^{20}$ or $R^{17}$ and $R^{20}$ or $R^{17}$ and $R^{18}$ are independently of each other hydrogen or halogen, and Me is as defined above.

Suitable naphthalocyanines conform for example to the formula II

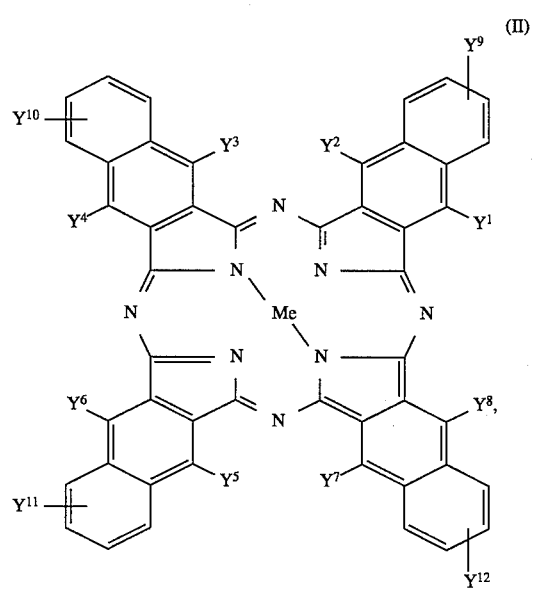

where $Y^1$, $Y^2$, $Y^3$, $Y^4$, $Y^5$, $Y^6$, $Y^7$ and $Y^8$ are independently of each other hydrogen, hydroxyl or a radical of the formula $W-X^4$, where W is a chemical bond, oxygen, sulfur, imino, $C_1-C_4$-alkylimino or phenylimino and $X^4$ is $C_1$–$C_{20}$-alkyl with or without interruption by from 1 to 4 oxygen atoms in ether function and with or without phenyl substitution, $C_5$–$C_7$-cycloalkyl or $C_3$–$C_{20}$-alkenyl, and $Y^9$, $Y^{10}$, $Y^{11}$ and $Y^{12}$ are independently of one another hydrogen, $C_1$–$C_{20}$-alkyl or $C_1$–$C_{20}$-alkoxy, wherein the alkyl groups may in each case be interrupted by from 1 to 4 oxygen atoms in ether function, halogen, hydroxysulfonyl or $C_1$–$C_4$-dialkylsulfamoyl, and Me is as defined above.

Of particular interest are naphthalocyanines of the formula II where at least one of $Y^1$ to $Y^8$ is not hydrogen.

Suitable nickel-dithiolene complexes conform for example to the formula III

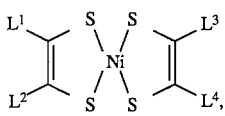  (III)

where $L^1$, $L^2$, $L^3$ and $L^4$ are independently of one another $C_1$–$C_{20}$-alkyl with or without interruption by from 1 to 4 oxygen atoms in ether function, phenyl, $C_1$–$C_{20}$-alkylphenyl, $C_1$–$C_{20}$-alkoxyphenyl, wherein the alkyl groups may in each case be interrupted by from 1 to 4 oxygen atoms in ether function, or $L^1$ and $L^2$ and/or $L^3$ and $L^4$ are in each case together the radical of the formula

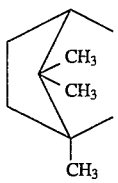

Suitable methine dyes conform for example to the formula IV

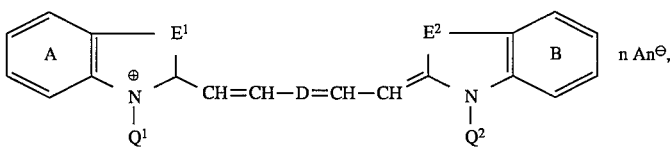  (IV)

where the rings A and B are independently of each other benzofused or unbenzofused and substituted or unsubstituted, $E^1$ and $E^2$ are independently of each other oxygen, sulfur, imino or a radical of the formula —C(CH$_3$)$_2$— or —CH=CH—, D is a radical of the formula

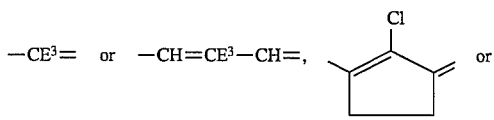 or

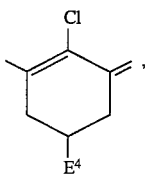

where $E^3$ is hydrogen, $C_1$–$C_6$-alkyl, chorine or bromine and $E^4$ is hydrogen or $C_1$–$C_6$-alkyl, $Q^1$ and $Q^2$ are independently of each other phenyl, $C_5$–$C_7$-cycloalkyl or $C_1$–$C_{12}$-alkyl with or without interruption by from 1 to 3 oxygen atoms in ether function and with or without substitution by hydroxyl, chloride, bromine, carboxyl, $C_1$–$C_4$-alkoxycarbonyl, acryloyloxy, methacryloyloxy, hydroxysulfonyl, $C_1$–$C_{12}$-alkanoylamino, $C_1$–$C_6$-alkylcarbamoyl, $C_1$–$C_6$-alkylcarbamoyloxy or by a radical of the formula G$^⊕$(K)$_3$, wherein G is nitrogen or phosphorus and K is phenyl, $C_5$–$C_7$-cycloalkyl or $C_1$–$C_{12}$-alkyl, An$^⊖$ is the equivalent of an anion, and n is 1, 2 or 3.

Suitable azulenesquaric acid dyes conform for example to the formula V

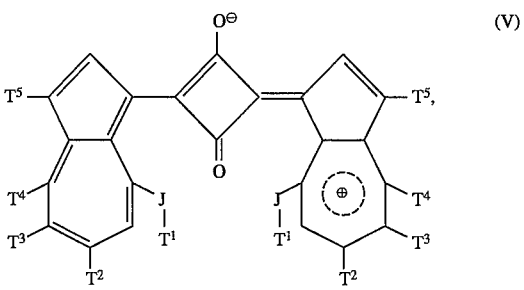  (V)

where

J is $C_1$–$C_2$-alkylene, $T^1$ is hydrogen, halogen, amino, hydroxyl, $C_1$–$C_{12}$-alkoxy, phenyl, substituted phenyl, carboxyl, $C_1$–$C_{12}$-alkoxycarbonyl, cyano or a radical of the formula —NT$^7$—CO—T$^6$, —CO—NT$^6$T$^7$ or O—CO—NT$^6$T$^7$, wherein T$^6$ and T$^7$ are independently of each other hydrogen, $C_1$–$C_{12}$-alkyl, $C_5$–$C_7$-cycloalkyl, phenyl, 2,2,6,6-tetramethylpiperidin-4-yl or cyclohexylaminocarbonyl, and $T^2$, $T^3$, $T^4$ and $T^5$ are independently of one another hydrogen or $C_1$–$C_{12}$-alkyl with or without substitution by halogen, amino, $C_1$–$C_{12}$-alkoxy, phenyl, substituted phenyl, carboxyl, $C_1$–$C_{12}$-alkoxycarbonyl or by cyano, with the proviso that in either or both azulene rings the ring positions of the substituents J—T$^1$ and T$^4$ may also be interchanged within an azulene ring when T$^5$ is hydrogen.

Any alkyl or alkylene appearing in the abovementioned formulae may be straight-chain or branched.

In the formula Ia, II or III, suitable $C_1$–$C_{20}$-alkyl with or without interruption by from 1 to 4 oxygen atoms in ether function includes for example methyl, ethyl, propyl, isopropyl, butyl, isobutyl, sec-butyl, tert-butyl, pentyl, isopentyl, neopentyl, tert-pentyl, hexyl, 2-methylpentyl, heptyl, octyl, 2-ethylhexyl, isooctyl, nonyl, isononyl, decyl, isodecyl, undecyl, dodecyl, tridecyl, 3,5,5,7-tetramethylnonyl, isotridecyl (the above designations isooctyl, isononyl, isodecyl and isotridecyl are trivial names derived from the oxo process alcohols—cf. Ullmann's Encyklopädie der technischen Chemie, 4th edition, volume 7, pages 215 to 217, and also volume 11, pages 435 and 436), tetradecyl, pentadecyl, hexadecyl, heptadecyl, octadecyl, nonadecyl, eicosyl, 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,8-trioxadecyl, 3,6,9-trioxaundecyl, 3,6,9,12-tetraoxatridecyl or 3,6,9,12-tetraoxatetradecyl.

In the formula I or II, suitable $C_1$–$C_{20}$-alkyl with phenyl substitution includes for example benzyl or 1- or 2-phenylethyl.

$C_5$–$C_7$-Cycloalkyl in the formula Ia or II includes for example cyclopentyl, cyclohexyl, methylcyclohexyl or cycloheptyl.

In the formula III, suitable $C_1$–$C_{20}$-alkoxy with or without interruption by from 1 to 4 oxygen atoms in ether function includes for example methoxy, ethoxy, propoxy, isopropoxy, butoxy, isobutoxy, pentyloxy, hexyloxy, heptyloxy, octyloxy, 2-ethylhexyloxy, isooctyloxy, nonyloxy, isononyloxy, decyloxy, isodecyloxy, undecyloxy, dodecyloxy, tridecyloxy, isotridecyloxy, tetradecyloxy, pentadecyloxy, hexadecyloxy, heptadecyloxy, octadecyloxy, nonadecyloxy, eicosyloxy, 2-methoxyethoxy, 2-ethoxyethoxy, 2-propoxyethoxy, 2-isopropoxyethoxy, 2-butoxyethoxy, 2- or 3-methoxypropoxy, 2- or 3-ethoxypropoxy, 2- or 3-propoxypropoxy, 2- or 3-butoxypropoxy, 2- or 4-methoxybutoxy, 2- or 4-ethoxybutoxy, 2- or 4-propoxybutoxy, 2- or 4-butoxybutoxy, 3,6-dioxaheptyloxy, 3,6-dioxaoctyloxy, 4,8-dioxanonyloxy, 3,7-dioxaoctyloxy, 3,7-dioxanonyloxy, 4,7-dioxaoctyloxy, 4,7-dioxanonyloxy, 4,8-dioxadecyloxy, 3,6,8-trioxadecyloxy, 3,6,9-trioxaundecyloxy, 3,6,9,12-tetraoxatridecyloxy or 3,6,9,12-tetraoxatetradecyloxy.

In the formula II, suitable $C_3$–$C_{20}$-alkenyl includes for example prop-2-en-1-yl, butenyl, but-3-en-1-yl, pentenyl, pent-4-en-1-yl, 3-methylbut-3-en-1-yl, hexenyl, heptenyl, octenyl, nonenyl, decenyl, undecenyl, undec-10-en-1-yl, dodecenyl, tridecenyl, tetradecenyl, pentadecenyl, hexedecenyl, heptadecenyl, octadecenyl, nonadecenyl or eicosenyl.

In the formula Ia, III or V, suitable substituted phenyl includes for example $C_1$–$C_6$-alkyl-, $C_1$–$C_6$-alkoxy-, hydroxyl- or halogen-substituted phenyl. In general, the number of substituents in substituted phenyl is from 1 to 3.

Halogen in the formula Ib, II or V includes for example fluorine, chlorine or bromine.

W in the formula Ia or II and also $X^2$ or $X^3$ in the formula Ib are each for example methylimino, ethylimino, propylimino, isopropylimino or butylimino.

$R^1$ to $R^{16}$ in the formula Ia and also $Y^9$ to $Y^{12}$ in the formula II are each for example dimethylsulfamoyl, diethylsulfamoyl, dipropylsulfamoyl, dibutylsulfamoyl or N-methyl-N-ethylsulfamoyl.

Substituted rings A and/or B in the formula IV may have as substituents for example $C_1$–$C_6$-alkyl, phenyl-$C_1$–$C_6$-alkoxy, phenoxy, halogen, hydroxyl, amino, mono- or di($C_1$–$C_6$-alkyl)amino or cyano. The number of substituents is generally from one to three.

$E^3$, $E^4$, $Q_1$ and $Q^2$ in the formula IV are each for example methyl, ethyl, propyl, isopropyl, butyl, isobutyl, sec-butyl, pentyl, isopentyl, neopentyl, tert-pentyl or hexyl.

$Q^1$ and $Q^2$ may each also be for example hexyl, 2-methylpentyl, heptyl, octyl, 2-ethylhexyl, isooctyl, nonyl, isononyl, decyl, isodecyl, undecyl, dodecyl, cyclopentyl, cyclohexyl, 2-methoxyethyl, 2-ethoxyethyl, 2- or 3-methoxypropyl, 2- or 3-ethoxypropyl, 2-hydroxyethyl, 2- or 3-hydroxypropyl, 2-chloroethyl, 2-bromoethyl, 2- or 3-chloropropyl, 2- or 3-bromopropyl, 2-carboxyethyl, 2- or 3-carboxypropyl, 2-methoxycarbonylethyl, 2-ethoxycarbonylethyl, 2- or 3-methoxycarbonylpropyl, 2- or 3-ethoxycarbonylpropyl, 2-acryloyloxyethyl, 2- or 3-acryloyloxypropyl, 2-methacryloyloxyethyl, 2- or 3-methacryloyloxypropyl, 2-hydroxysulfonylethyl, 2- or 3-hydroxysulfonylpropyl, 2-acetylaminoethyl, 2- or 3-acetylaminopropyl, 2-methylcarbamoylethyl, 2-ethylcarbamoylethyl, 2- or 3-methylcarbamoylpropyl, 2- or 3-ethylcarbamoylpropyl, 2-methylcarbamoyloxyethyl, 2-ethylcarbamoyloxyethyl, 2- or 3-methylcarbamoyloxypropyl, 2- or 3-ethylcarbamoyloxypropyl, 2-(trimethylammonium)ethyl, 2-(triethylammonium)ethyl, 2- or 3-(trimethylammonium)propyl, 2- or 3-(triethylammonium)propyl, 2-(triphenylphosphonium)ethyl or 2- or 3-(triphenylphosphonium)propyl.

An$^\ominus$ in the formula IV is derived for example from anions of organic or inorganic acids. Particular preference is given to, for example, methanesulfonate, 2- or 4-methylbenzenesulfonate, acetate, trifluoroacetate, heptafluorobutyrate, chloride, bromide, iodide, perchlorate, tetrafluoroborate, nitrate, hexafluorophosphate or tetraphenylborate.

Also usable as inorganic anions are the anions of heteropoly acids, for example of phosphorus or silicon. Specific examples are molybdatophosphoric acid, molybdatosilicic acid, vanadatophosphoric acid, vanadatosilicic acid, wolframatophosphoric acid, wolframatosilicic acid or mixed acids of this kind.

J in the formula V is for example methylene, ethylene, 1,2- or 1,3-propylene, 1,2-, 1,3-, 2,3- or 1,4-butylene, pentamethylene, hexamethylene, heptamethylene, octamethylene, nonamethylene, decamethylene, undecamethylene or dodecamethylene.

$T^2$, $T^3$, $T^4$ and $T^5$ in the formula V are each for example methyl, ethyl, propyl, isopropyl, butyl, isobutyl, sec-butyl, tert-butyl, pentyl, isopentyl, neopentyl, tert-pentyl, 2-methylbutyl, hexyl, 2-methylpentyl, heptyl, octyl, 2-ethylhexyl, isooctyl, nonyl, isononyl, decyl, undecyl, dodecyl, fluoromethyl, chloromethyl, difluoromethyl, trifluoromethyl, trichloromethyl, 2-fluoroethyl, 2-chloroethyl, 2-bromoethyl, 1,1,1-trifluoroethyl, heptafluoropropyl, 4-chlorobutyl, 5-fluoropentyl, 6-chlorohexyl, cyanomethyl, 2-cyanoethyl, 3-cyanopropyl, 2-cyanobutyl, 4-cyanobutyl, 5-cyanopentyl, 6-cyanohexyl, 2-aminoethyl, 2-aminopropyl, 3-aminopropyl, 2-aminobutyl, 4-aminobutyl, 5-aminopentyl, 6-aminohexyl, 2-hydroxyethyl, 2-hydroxypropyl, 3-hydroxypropyl, 2-hydroxybutyl, 4-hydroxybutyl, 5-hydroxypentyl, 6-hydroxyhexyl, 2-methoxyethyl, 2-ethoxyethyl, 2-propoxyethyl, 2-isopropoxyethyl, 2-butoxyethyl, 2-methoxypropyl, 2-ethoxypropyl, 3-ethoxypropyl, 4-ethoxybutyl, 4-isopropoxybutyl, 5-ethoxypentyl, 6-methoxyhexyl, benzyl, 1-phenylethyl, 2-phenylethyl, 4-chlorobenzyl, 4-methoxybenzyl, 2-(4-methylphenyl)ethyl, carboxymethyl, 2-carboxyethyl, 3-carboxypropyl, 4-carboxybutyl, 5-carboxypentyl, 6-carboxyhexyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, 5-methoxycarbonylpentyl, 5-ethoxycarbonylpentyl, 6-methoxycarbonylhexyl or 6-ethoxycarbonylhexyl.

$T^1$ in the formula V is for example methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, pentyloxycarbonyl, isopentyloxycarbonyl, neopentyloxycarbonyl, tert-pentyloxycarbonyl, hexyloxycarbonyl, heptyloxycarbonyl, octyloxycarbonyl, isooctyloxycarbonyl, nonyloxycarbonyl, isononyloxycarbonyl, decyloxycarbonyl, isodecyloxycarbonyl, undecyloxycarbonyl, dodecyloxycarbonyl, methoxy, ethoxy, propoxy, isopropoxy, butoxy, isobutoxy, pentyloxy, hexyloxy, acetylamino, carbamoyl, mono- or dimethylcarbamoyl, mono- or diethylcarbamoyl, monocyclohexylcarbamoyl, phenylcarbamoyl, dimethylcarbamoyloxy or diethylcarbamoyloxy.

Preference is given to ink-ribbons comprising one or more compounds of the class of the naphthalocyanines or nickel-dithiolene complexes, the compounds of the class of the naphthalocyanines being particularly suitable.

Worth mentioning in particular are ink-ribbons comprising one or more of the naphthalocyanines of the formula IIa

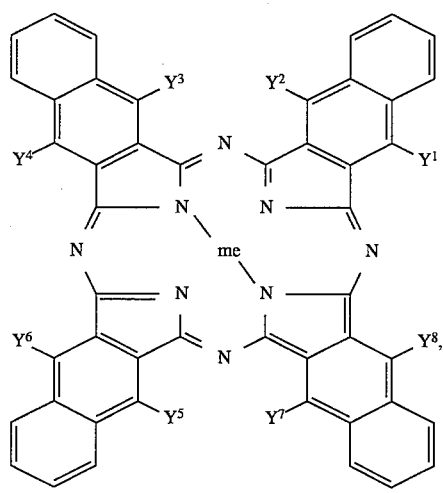

(IIa)

where $Y^1, Y^2, Y^3, Y^4, Y^5, Y^6, Y^7$ and $Y^8$ are independently of one another hydrogen, hydroxyl, $C_1-C_4$-alkyl or $C_1-C_{20}$-alkoxy, and Me is two times hydrogen, two times lithium, magnesium, zinc, copper, nickel, VO or AlCl.

Particulalry worth mentioning are ink-ribbons comprising one or more naphthalocyanines of the formula IIa where $Y^1$, $Y^2, Y^3, Y^4, Y^5, Y^6, Y^7$ and $Y^8$ are independently of one another hydroxyl, $C_1-C_{20}$-alkoxy, in particular $C_1-C_{10}$-alkoxy. The alkoxy radicals can be identical or different.

Also particularly worth mentioning are ink-ribbons comprising one or more naphthalocyanines of the formula IIa where Me is two times hydrogen.

Also worth mentioning are ink-ribbons comprising one or more nickel-dithiolene complexes of the formula III where $L^1, L^2, L^3$ and $L^4$ are independently of one another phenyl, $C_1-C_{20}$-alkylphenyl, $C_1-C_{20}$-alkoxyphenyl or hydroxyl- or $C_1-C_{20}$-alkyl-substituted phenyl, or $L^1$ and $L^2$ and also $L^3$ and $L^4$ are in each case together the radical of the formula

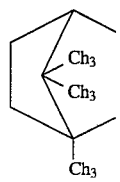

Also particularly worth mentioning are ink-ribbons comprising one or more nickel-dithiolene complexes of the formula III where $L^1$ and $L^4$ are each phenyl and $L^2$ and $L^4$ are each a radical of the formula $4-[C_2H_5-C(CH_3)_2]-C_6H_4$.

The phthalocyanines of the formula Ia are known per se and described for example in DE-B-1 073 739 or EP-A-155 780, or can be obtained by methods known per se as used in the synthesis of phthalocyanines or naphthalocyanines and as described for example in F. H. Moser, A. L. Thomas "The Phthalocyanines", CRC Press, Boca Rota, Fla., 1983, or J. Amer. Chem. Soc. 106 (1984), 7404–10. The phthalocyanines of the formula Ib are likewise known per se and described for example in EP-A-155 780 or can be obtained by the methods of the abovementioned prior art (Moser, J. Amer. Chem. Soc.).

The naphthalocyanines of the formula II are likewise known per se and described for example in GB-A-2 168 372 or GB-A-2 200 650 or can be obtained by the methods of the above-cited prior art (Moser, J. Amer. Chem. Soc.).

The nickel-dithiolene complexes of the formula III are likewise known per se and described for example in EP-A-192 215.

The methine dyes of the formula IV are likewise known per se and are described for example in EP-A-464 543 or can be obtained by the methods mentioned therein.

The azulenesquaric acid dyes of the formula V are likewise known per se and described for example in EP-A-310 080 or U.S. Pat No. 4,990,649 or can be obtained by the methods mentioned therein.

In the preparation of the ink-ribbons of the present invention, the abovementioned compounds are used in the form of liquid preparations.

These preparations comprise the abovementioned compounds and also, as solvent, at least one product selected from the group consisting of olein, $C_4-C_{13}$-dialkyl phthalates, $C_1-C_{30}$-chloroalkanes, $C_1-C_{20}$-diphenylalkanes, $C_1-C_{10}$-dialkylnaphthalenes and partly hydrogenated terphenyl.

Olein for the purposes of the present invention is technical grade oleic acid as produced in the acid hydrolysis of fats. It may additionally contain small amounts of stearic acid, palmitic acid and other fatty acids.

Suitable solvents for the preparations include for example olein, $C_4-C_{13}$-dialkyl phthalates, such as dibutyl phthalate, diisobutyl phthalate, di-sec-butyl phthalate, dipentyl phthalate, diisopentyl phthalate, dihexyl phthalate, diheptyl phthalate, dioctyl phthalate, diisooctyl phthalate, bis(2-ethylhexyl) phthalate, dinonyl phthalate, diisononyl phthalate, didecyl phthalate, diisodecyl phthalate, diundecyl phthalate, didocyl phthalate, ditridecyl phthalate or diisotridecyl phthalate, $C_5-C_{30}$-chloroalkanes, such as chloroeicosane or chlorotetracosane, $C_1-C_{20}$-diphenylalkanes, such as diphenyldecane or diphenyltetradecane, $C_1-C_{10}$-dialkylnaphthalenes, such as diisopropylnaphthalene, partly hydrogenated terphenyl, such as compounds of the formula

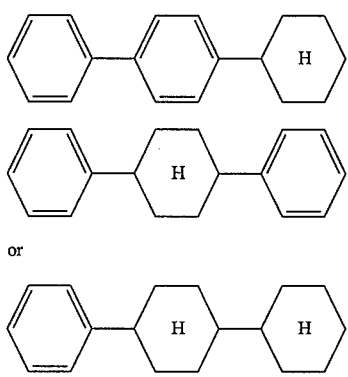

or mixtures thereof.

Preference is given to using liquid preparations comprising from 20 to 80% by weight, preferably from 30 to 70, in particular from 40 to 60% by weight, in each case based on the weight of the preparation, of one or more of the abovementioned IR-absorbing compounds.

Preference is further given to using liquid preparations comprising as solvents at least one product selected from the group consisting of benzyl alcohol, 2-phenoxythanol, olein, $C_8$-dialkyl phthalate and diisopropylnaphthalene.

The liquid preparations are prepared by dissolving one or more of the IR-absorbing compounds in the abovementioned concentration in one or more of the abovementioned solvents.

The preparation of ink-ribbons is known per se; cf. for example coating 1972, 72–73, 213–214.

So an ink-ribbon is produced for example by additionally milling the above-described liquid preparation with mineral oils, nondrying, animal or vegetable oils, such as neat's foot oil, bone oil, colza oil, groundnut oil, sperm oil, castor oil, rape oil or dripping, and optionally olein and other assistants, for example plasticizers, such as dioctyl phthalate, in a ball mill, bead mill or three-roll mill and applied to a base fabric woven from cotton, silk or nylon.

The ink-ribbons of the present invention generally contain, in each case based on 1 $m^2$ of ink-ribbon, from 3 to 40 g, preferably from 5 to 30 g, in particular from 10 to 20 g, of IR-absorbing compounds, and those ink-ribbons which have from 14 to 18 g per $m^2$ of ink-ribbon of IR-absorbing compounds are particularly worthy of note.

The novel ink-ribbons are advantageously useful for producing IR-readable scripts or codings, these scripts or codings having a high absorption in the IR region notwithstanding their low visibility.

The Examples which follow illustrate the invention.

General method for producing an ink-ribbon.

A) 5 g of an IR-absorbing compound are dissolved in a mixture of 25 g of olein and 25 g of diisopropylnaphthalene at 80° C. The resulting preparation is then used to impregnate a cotton fabric.

B) 10 g of an IR-absorbing compound are dissolved in a mixture of 40 g of olein, 40 g of mineral oil and 10 g of dioctyl phthalate at 90° C. The resulting preparation is then printed onto a cotton fabric.

The compounds used are listed below. The results obtained are virtually colorless prints which have a high absorption in the IR region.

Compounds 1 and 2

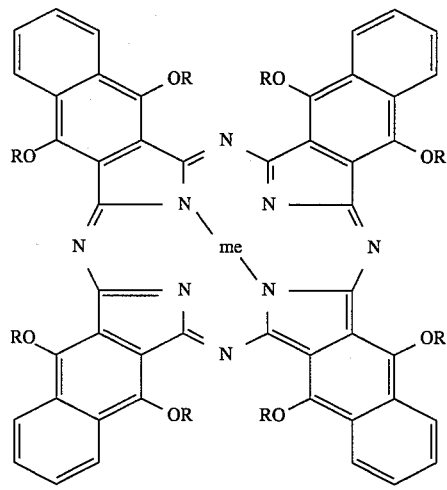

R = n-$C_4H_9$
Compound 1: Me = 2H
Compound 2: Me = Cu

Compound 3

Copper hexadecaphenylthiophthalocyanine

Compound 4

Copper tetradecaphenylthiophthalocyanine

Compound 5

Copper tetradecadodecylthiophthalocyanine

Compounds 6 and 7

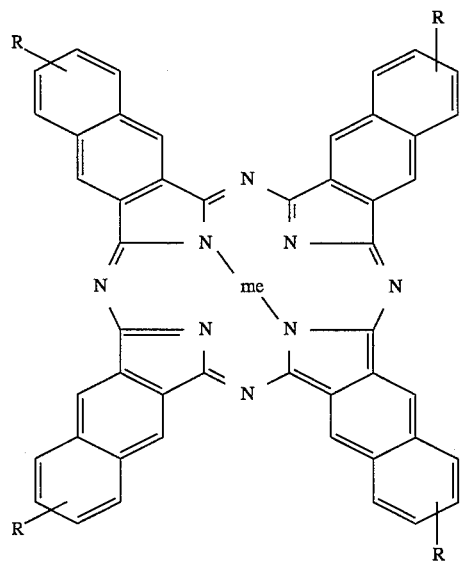

R = t-$C_4H_9$
Compound 6: Me = 2H
Compound 7: Me = Zn

Compound 8

Copper  hexadeca(4-tert-butylphenylthio)phthalocyanine

Compounds 9 to 13

[Structure: Ni complex with L¹, L², L³, L⁴ substituents on two dithiolene ligands]

| Compound No. | L¹ | L² | L³ | L⁴ |
|---|---|---|---|---|
| 9 | 3,5-di-tert-butyl-4-hydroxyphenyl | $C_6H_5$ | 3,5-di-tert-butyl-4-hydroxyphenyl | $C_6H_5$ |
| 10 | 4-(2-methylbutan-2-yl)phenyl [p-C(CH₃)₂C₂H₅-C₆H₄-] | $C_6H_5$ | 4-(2-methylbutan-2-yl)phenyl | $C_6H_5$ |
| 11 | $C_6H_5$ | $C_6H_5$ | $C_6H_5$ | $C_6H_5$ |
| 12 | 4-dodecylphenyl [p-$C_{12}H_{25}$-$C_6H_4$-] | $C_6H_5$ | 4-dodecylphenyl | $C_6H_5$ |
| 13 | 2,6,6-trimethylbicyclic group | — | 2,6,6-trimethylbicyclic group | — |

Compounds 14 to 18

[Structure: bis-indolium pentamethine cyanine dye with Q¹, Q², Q³, Q⁴ substituents and An⁻ counterion]

| Compound No. | Q¹ | Q² | Q³ | Q⁴ | An⁻ |
|---|---|---|---|---|---|
| 14 | $CH_3$ | $CH_3$ | Cl | Cl | $I^{\ominus}$ |
| 15 | $CH_3$ | $CH_3$ | H | H | $I^{\ominus}$ |
| 16 | $C_2H_4OCNHC(CH_3)_3$ (with C=O) | $C_2H_4OCNHC(CH_3)_3$ (with C=O) | H | H | $I^{\ominus}$ |
| 17 | $C_2H_4CNHC_6H_{13}$ (with C=O) | $C_2H_4CNHC_6H_{13}$ (with C=O) | H | H | $ClO_4^{\ominus}$ |
| 18 | $C_3H_6SO_3^{\ominus}$ | $C_3H_6SO_3H$ | H | H | betaine |

Compound No. 19

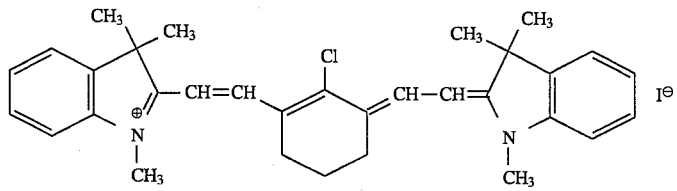

We claim:

1. Ink-ribbons comprising a ribbon substrate having incorporated therein one or more compounds of the class of the metal-free phthalocyanines, the phthalocyanines which have two times lithium, magnesium, tin, zinc, copper, manganese, nickel, VO, TiO, AlCl or InCl as central atom, the metal-free naphthalocyanines, the naphthalocyanines which have two times lithium, magnesium, tin, zinc, copper, manganese, nickel, VO, TiO, AlCl or InCl as central atom, the nickel-dithiolene complexes, the methine dyes or the azulenesquaric acid dyes which each have their absorption maximum within the range from 700 to 1200 nm.

2. Ink-ribbons as claimed in claim 1 comprising one or more compounds of the class of the naphthalocyanines or the nickel-dithiolene complexes.

3. Ink-ribbons as claimed in claim 1, additionally containing at least one solvent selected from the group consisting of olein, $C_4$–$C_{13}$-dialkyl phthalates, $C_1$–$C_{30}$-chloroalkanes, $C_1$–$C_{20}$-diphenylalkanes, $C_1$–$C_{10}$-dialkylnaphthalenes and partly hydrogenated terphenyl.

4. Ink ribbons as claimed in claim 1, comprising at least one naphthalocyanine.

5. Ink ribbons as claimed in claim 4, wherein the naphthalocyanine contains copper as the central atom.

6. Ink-ribbons as claimed in claim 4, wherein the naphthalocyanine contains AlCl as the central atom.

7. Ink-ribbons as claimed in claim 4, wherein the naphthalocyanine is metal-free.

8. Ink ribbons as claimed in claim 4, wherein the naphthalocyanine has the formula:

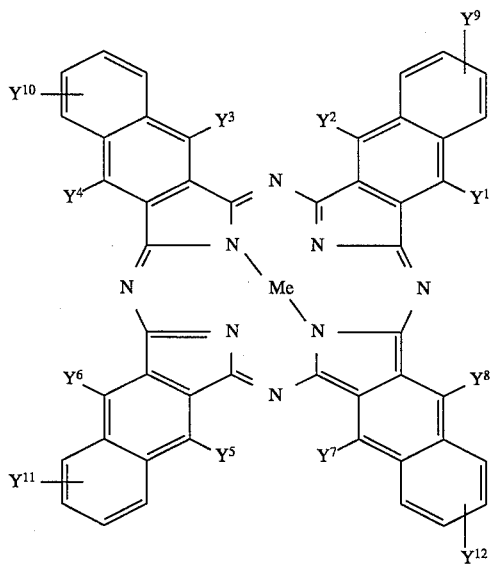

where $Y^1$, $Y^2$, $Y^3$, $Y^4$, $Y^5$, $Y^6$, $Y^7$ and $Y^8$ are independently of each other hydrogen, hydroxyl or a radical of the formula W—$X^4$, where W is a chemical bond, oxygen, sulfur, imino, $C_1$–$C_4$-alkylimino or phenylimino and $X^4$ is $C_1$–$C_{20}$-alkyl with or without interruption by from 1 to 4 oxygen atoms in ether function and with or without phenyl substitution, $C_5$–$C_7$-cycloalkyl or $C^3$–$C^{20}$-alkenyl, and $Y^9$, $Y^{10}$, $Y^{11}$ and $Y^{12}$ are independently of one another hydrogen, $C_1$–$C_{20}$-alkyl or $C_1$–$C_{20}$-alkoxy, wherein the alkyl groups may in each case be interrupted by from 1 to 4 oxygen atoms in ether function, halogen, hydroxysulfonyl or $C_1$–$C_4$-dialkylsulfamoyl, and Me is two times hydrogen, two times lithium, magnesium, tin, zinc, copper, manganese, nickel, VO, TiO, AlCl or InCl.

* * * * *